United States Patent [19]

Kress et al.

[11] 4,344,724
[45] Aug. 17, 1982

[54] CUTTING TOOL ASSEMBLY

[75] Inventors: Dieter Kress, Aalen; Friedrich Häberle, Lauchheim, both of Fed. Rep. of Germany

[73] Assignee: MAPAL Fabrik für Prazisionswerkzeuge Dr. Kress KG, Aalen, Fed. Rep. of Germany

[21] Appl. No.: 194,431

[22] Filed: Oct. 6, 1980

[30] Foreign Application Priority Data

Oct. 11, 1979 [DE] Fed. Rep. of Germany ....... 2941179

[51] Int. Cl.³ .................. B26D 1/14; B23B 29/02; B23B 27/08; B23B 27/16
[52] U.S. Cl. ........................... 407/36; 407/44; 408/146; 408/239 R; 144/219
[58] Field of Search .............. 30/294, 169, 329, 339, 30/332, 335, 2, 156, 164.95, 165, 287, 288, 296 R, 314, 317, 337, 342, 344, 500, 286, 279 R, 289, 299; 408/153, 179, 713, 146, 144, 198, 59, 239 R, 240, 197; 407/36, 37, 38, 39, 44, 45, 110; 144/219

[56] References Cited

U.S. PATENT DOCUMENTS

| | | | |
|---|---|---|---|
| 899,539 | 9/1908 | Johnson et al. | 30/339 |
| 1,903,789 | 4/1933 | Michaels | 30/317 |
| 2,400,856 | 5/1946 | Thompson | 408/239 |
| 3,546,759 | 12/1970 | Sirola | 408/146 |
| 3,658,434 | 4/1972 | Benjamin et al. | 408/239 |
| 3,667,768 | 6/1972 | Stokey | 408/239 |
| 3,724,010 | 4/1973 | Scholl | 30/294 |
| 3,859,700 | 1/1975 | Jilbert | 407/110 |
| 3,861,010 | 1/1975 | Weinreich | 408/239 |
| 3,921,289 | 11/1975 | Hasegawa | 30/342 |
| 3,966,350 | 6/1976 | Benjamin | 408/239 R |
| 4,047,826 | 9/1977 | Bennett | 408/59 |
| 4,079,908 | 3/1978 | Davis | 30/344 |
| 4,251,172 | 2/1981 | Durand | 408/233 |

Primary Examiner—Jimmy C. Peters
Assistant Examiner—Robert A. Rose
Attorney, Agent, or Firm—Toren, McGeady & Stanger

[57] ABSTRACT

A cutting tool assembly having a cutter head including a pair of jaws defining a slot therebetween with a knife plate having a pair of axially symmetrical cutting edges being exchangeably mounted in the cutter head in the slot between the jaws is provided with a setscrew adjustably connecting the knife plate on the cutter head and with a pair of support members arranged at the base of the slot between the knife plate and the cutter head cooperating with the setscrew to enable adjustment of the knife plate. The support members are internally threaded and interconnected by a bolt having oppositely threaded portions with oblique abutment surfaces being formed on the support members for engagement with the knife plate.

7 Claims, 6 Drawing Figures

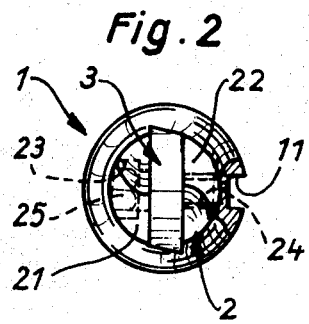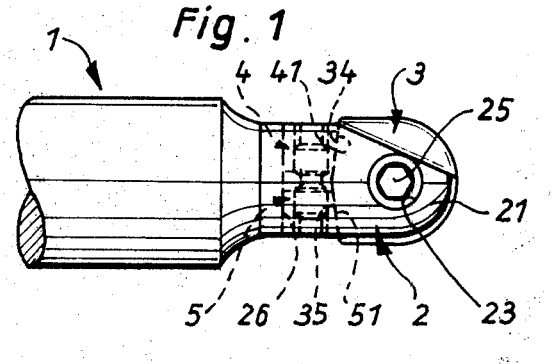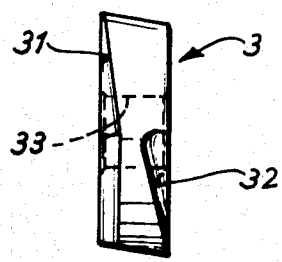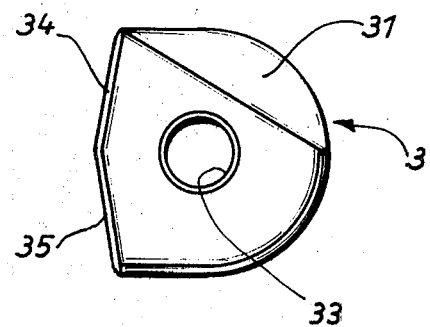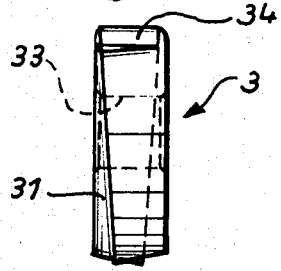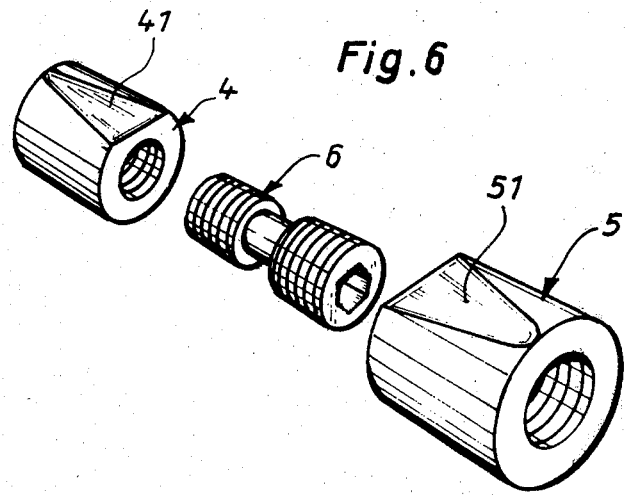

CUTTING TOOL ASSEMBLY

The present invention relates generally to a cutting tool which includes a knife plate which is exchangeably inserted in the end of a cutter head, with the knife plate being provided with a pair of axially symmetrical cutting edges.

In order to achieve high accuracy and good surface quality in the work products produced by tools of the type to which the present invention relates, the two diametrically opposed cutting edges of the tool must be arranged to lie precisely on a flight circle concentric relative to the axis of the tool. Otherwise, an exact concentricity and resulting equal cutting pressure of the two cutting edges could not be ensured. Consequently, especially where high cutting efficiency is to be obtained by tools of this type, the knife plate must be supported in a stable manner and must be securely adjustably retained in position.

Accordingly, the present invention is directed toward provision of a cutting tool enabling stable adjustable securing of the knife plate by means which are relatively simple in design and which also make it possible to easily exchange and replace the knife plate.

SUMMARY OF THE INVENTION

Briefly, the present invention may be defined as a cutting tool assembly comprising a cutter head including a pair of jaws defining a slot therebetween, a knife plate defining a pair of axially symmetrical cutting edges exchangeably mounted on the cutting head in said slot between said jaws, setscrew means for adjustably connecting the knife plate on the cutter head, a pair of support members arranged at the base of the slot between the knife plate and the cutter head, said support members acting as abutment means for the knife plate and bolt means having oppositely threaded portions engaging each of said support members, respectively, and cooperating with the setscrew means to enable adjustment of the knife plate.

In accordance with the present invention, the knife plate may be held between the axially symmetrical longitudinal slot which is defined between the pair of jaws so that an exact concentricity and a uniform cutting pressure of the diametrically opposed cutting edges may be ensured even at high cutting capacity and so that exchange of the cutting plate may be accomplished in a relatively simple manner.

In a preferred embodiment of the invention, the cutter head is provided with a bore located at the base of the slot within which the support members are received, with the support members being formed as internally threaded members engaging the bolt means and being provided with generally symmetrically arranged oblique surfaces against which the knife plate may abut.

If a two-way or reversible plate is used as the knife plate having cutting edges which are not in engagement bearing against the abutment surfaces, the latter will have an additional oblique surface which corresponds to the undercutting angle. To avoid contact of the abutment surfaces which are concentrated in a point, the abutment surfaces are advantageously constructed in such a way that they bear against the cutting edges which are not in engagement over a flat area. In the case where the cutting edges are curved, the abutment surfaces may have a concave configuration which corresponds to the curvature of the cutting edges.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWING

In The drawing:

FIG. 1 is a longitudinal side view of a cutter assembly in accordance with the invention;

FIG. 2 is a front view of the cutter assembly of FIG. 1;

FIG. 3 is a side view of a knife plate of the assembly of the present invention;

FIG. 4 is a front view of the knife plate;

FIG. 5 is a view of a narrow side of the knife plate viewed perpendicularly relative to the longitudinal axis of the cutter head; and FIG. 6 is an exploded perspective view showing support members formed as internally threaded members with a threaded bolt for interconnecting the support members.

DETAILED DESCRIPTION OF THE PREFERRED EMBODIMENT

Referring now to the drawing, there is depicted a cutting tool assembly 1 in accordance with the present invention including a cutter head 2 and a knife plate 3. The cutter head 2 is formed with a pair of jaws 21, 22 defining a slot therebetween within which the knife plate 3 is received. The knife plate 3 is formed with a pair of axially symmetrical oblique surfaces 31, 32 having outer boundaries which form the cutting edges of the tool and which, together with a pair of oblique surfaces formed by lateral recesses of the cutter head jaws 21, 22, define a cutting space or chamber.

The knife plate 3 is formed with a bore 33 which receives a setscrew 25 and with a pair of rearward end faces 34, 35 by means of which the knife plate 3 bears against oblique surfaces 41 and 51 of a pair of support members 4 and 5 which are internally threaded and which are arranged within a bore 26 of the cutter head 2.

The bore 26 extends perpendicularly to the axis of the cutter head at the base of the slot within which the knife head is arranged between the knife plate and the cutter head. The slot 26 extends across the entire width of the slot within which the knife plate 3 is received. The support members 4 and 5 are formed with oppositely threaded internal threads with one of the support members 4, 5 having a left-hand thread and with the other having a right-hand thread. A bolt 6 is provided at opposite ends thereof with corresponding external threads which are also oppositely threaded and upon which the left- and right-hand threads of the support members 4 and 5 are received, respectively.

The support members 4 and 5 are adjustably engaged with the bolt 6 to enable longitudinal movement relative to each other. By means of such longitudinal movement of the support members 4 and 5, the two oblique surfaces 41 and 51 will slide along the rearward end faces 34 and 35 of the knife plate 3 and operate to fix the faces 34, 35 in axial symmetrical position in cooperation with the setscrew 25 which extends through the two cutter jaws 21 and 22.

The head of the setscrew 25 is received by a cylindrical bore 23 of the jaw 21 and with a threaded provided at its opposite end the screw engages in a threaded bore 24 of the jaw 22.

The cutter head 2 is formed at a rearward shaft portion thereof with a longitudinal groove 11 into which an engaging member of a drive sleeve or chuck may engage for operation of the tool.

The advantages of the invention are essentially achieved in that the setscrew 25 which presses together the jaws of the cutter head 2 will extend through the knife plate 3 and in its rearward region the knife plate 3 will engage against the oblique surfaces 41, 51 of the support members 4, 5 which may be threadedly moved relative to each other in order to enable adjustable positioning of the knife plate, with the oblique surfaces 41, 51 forming an included angle between each other.

If the knife plate is to be of the reversible type, the rearward end faces 34, 35 may also constitute knife edges. In such a case, the oblique surfaces 41, 51 may be formed as concave surfaces which are curved in the radial direction of the members 4 and 5. In order to avoid contact between the abutment surfaces 41, 51 and the rearward end faces 34, 35 which is concentrated at a point, the abutment surfaces are advantageously constructed in such a way that they bear against the faces 34 and 35 over a flat or more extended area. The concavity of the abutment surfaces 41, 51 may be formed with a curvature which corresponds to the curvature of the end faces 34, 35.

The end faces 34, 35 are formed so that the included angle therebetween is not less than 140 degrees and preferably about 160 degrees.

While a specific embodiment of the invention has been shown and described in detail to illustrate the application of the inventive principles, it will be understood that the invention may be embodied otherwise without departing from such principles.

What is claimed is:

1. A cutting tool assembly comprising: a cutter head including a pair of jaws defining a slot therebetween; a knife plate defining a pair of axially symmetrical cutting edges exchangeably mounted on said cutter head in said slot between said jaws; setscrew means adjustably connecting said knife plate on said cutter head; a pair of support members arranged at the base of said slot between said knife plate and said cutter head, said support members acting as abutment means for said knife plate; and bolt means having oppositely threaded portions engaging said support members, respectively, and cooperating with said setscrew means to enable adjustment of said knife plate.

2. An assembly according to claim 1 wherein said cutter head is provided at the base of said slot with a bore in which said support members are received, said support members being formed as internally threaded members engaging said bolt means and being provided with generally symmetrically arranged oblique surfaces against which said knife plate abuts.

3. An assembly according to claims 1 or 2 wherein said knife plate is provided with a pair of rearward end faces arranged to abut against said support members, said rearward end faces being formed so that the angle included therebetween is at least 140 degrees.

4. A cutting tool assembly according to claim 3 wherein said included angle is 160 degrees.

5. An assembly according to claims 1 or 2 wherein said knife plate is constructed as a reversible member having cutting surfaces thereon which may be reversibly used as abutment surfaces for abutting against said support members.

6. An assembly according to claim 4 wherein said support members comprise oblique surfaces serving as abutments for said knife plate having an additional oblique surface which corresponds to the undercutting angle of said knife plate.

7. An assembly according to claim 1 wherein said support members comprise oblique surfaces arranged to have said knife plate abut thereagainst, said oblique surfaces being formed with a concave configuration.

* * * * *